(12) United States Patent
Zhang et al.

(10) Patent No.: US 7,272,306 B2
(45) Date of Patent: Sep. 18, 2007

(54) BIONIC AUTOMATIC VISION AND LINE OF SIGHT CONTROL SYSTEM AND METHOD

(76) Inventors: Xiaolin Zhang, 21-16-504, 4 chome, Simomaruko, Oota-ku, Tokyo (JP) 146-0092; Guangrang Zhang, 502, 10th building, 228 long, Guangxi Beilu, Shanghai (CN) 200001

( * ) Notice: Subject to any disclaimer, the term of this patent is extended or adjusted under 35 U.S.C. 154(b) by 354 days.

(21) Appl. No.: 11/108,390

(22) Filed: Apr. 18, 2005

(65) Prior Publication Data

US 2005/0185945 A1    Aug. 25, 2005

(51) Int. Cl.
*G03B 17/00*    (2006.01)
*G03B 35/08*    (2006.01)
*H04N 7/18*    (2006.01)

(52) U.S. Cl. .................. 396/325; 396/428; 348/48; 348/159; 348/169; 901/47

(58) Field of Classification Search ............... 396/325, 396/333, 427, 428; 348/48, 143, 153, 159, 348/169; 382/103; 700/259; 901/47
See application file for complete search history.

(56) References Cited

U.S. PATENT DOCUMENTS

| | | | | |
|---|---|---|---|---|
| 4,818,858 A | * | 4/1989 | Sorimachi et al. | 250/203.2 |
| 5,475,422 A | * | 12/1995 | Mori et al. | 348/48 |
| 5,838,368 A | * | 11/1998 | Masunaga et al. | 348/211.9 |
| 6,591,064 B2 | * | 7/2003 | Higashiyama et al. | 396/18 |
| 6,915,008 B2 | * | 7/2005 | Barman et al. | 382/154 |
| 6,970,576 B1 | * | 11/2005 | Tilsley | 382/103 |
| 2006/0115256 A1 | * | 6/2006 | Nomura | 396/55 |

* cited by examiner

*Primary Examiner*—W. B. Perkey
(74) *Attorney, Agent, or Firm*—Qin Zhang

(57) ABSTRACT

The present invention presents a bionic automatic vision and line of sight control system and method, wherein the system comprises multiple camera sets, wherein each camera set comprises one or more parallel camera with different shooting range, wherein each camera set is driven by one or three actuators, capable of rotating in two or three degree of freedom. The present system is capable of fast object positioning, high accuracy tracking and wide range compensation for line of sight deviation caused by the movement of the system. More specifically, the system can ensure two camera sets to position and track the same object at the same time. The present system not only can be used in various fixed places to monitor, protect and care taking, it can also be installed on various moving objects, such as cars, airplanes, boats, military equipments, and it can be used as eyes for various types of robots.

17 Claims, 5 Drawing Sheets

BIONIC AUTOMATIC VISION AND LINE OF SIGHT CONTROL SYSTEM AND METHOD

FIELD OF INVENTION

This application claims the benefit of prior filed Chinese application filed on Oct. 22, 2002 through international application PCT/CN2003/000872 filed on Oct. 20$^{th}$, 2003 designating the United States of America. The present invention is related to bionic automatic vision and line of sight control system and method, also known as bionic robot eyes, which use cameras as the human eyes, wherein the motions of the cameras are controlled by principles of the nerve systems of human eyes. Therefore, the present invention has similar functions as the human eyes, it can perform object positioning, line of sight tracking, and compensate deviation of line of sight due to the movement of the system, especially because the current invention is capable of assuring simultaneous positioning of both eyes and following the same object, which leads to accurate measuring of the object position and distance, and obtain clear image of the object.

DESCRIPTION OF RELATED ART

The conventional object tracking methods of automatic surveillance systems mainly use visual feedback control techniques only. When only these methods are used, the speed of tracking the object is very low, so it cannot follow the moving speed of itself or the moving speed of the object. The compensation method for vibration and movement of the camera is merely for minor movement adjustment using image processing, similar to the treatment of preventing the hand shaking when holding a home video camera. The magnitude of the compensation is small. When more than two cameras are used, the position of each camera is fixed in respect to each other. When each camera are controlled independently, multiple cameras cannot simultaneously position and track the same object. When the tracked object needs to be zoomed in, other objects will escape from the viewing field and cannot be tracked.

SUMMARY OF THE INVENTION

The object of the present invention is to provide an bionic automatic vision and line of sight control system, wherein the control principle of the nerve system of human oculomotor system was used to obtain the automatic control system and automatic control method to control the movements of the cameras, in order to accurately, quickly and precisely detect the object position and track the object by the line of sight, by reducing the deviation of camera's line of sight caused by the strong and wide range vibration and movement of camera itself, to ensure multiple cameras to detect and track the same object. Furthermore, it is possible to observe and monitor wide range, to watch surrounding objects and change into tracking other object while measuring, tracking and recording the object precisely.

One preferred embodiment of the precise invention is disclosed as the following: The basic structure of the system is a monocular and binocular structure controlled by a central controller, wherein each "eyeball" comprises of one camera set, wherein each camera set comprises of one or more cameras. Two monocular control systems constitute binocular system. omnidirectional camera, through position transformation, the relative direction from the object to the monocular or binocular can be calculated, and the line of sight of the monocular or binocular can be directed towards the object. That is, the object is at the center of the visual field of the telephoto camera, and the telephoto camera can obtain clear images of the object.

When the telephoto camera focus on an interested object, because of the clear image, the feature point of the object can be found, and the telephoto camera then focus on the feature point (similar to the second saccade human eye movement). When the feature point moves, the image processing program of the telephoto camera will calculate the horizontal and vertical deviation between the feature point and the center of the visual field and the movement speed, the deviation and speed information are used to control the rotation movement of the camera set, to automatically track the feature point (similar to the smooth pursuit human eyeball movement).

When multiple interested objects appear in the visual field of the wide angle camera, each object is numbered according to the appearing sequence or its relative position in the visual field, and then be focused on in turn as stated above. The "interested object" here can be selected according to user's request, such as moving object in the visual field, object with special color, special shape (e.g. face, figure, car, stair, etc.), or it can be selected directly through user interfaces such as keyboard or screen. Similarly, when multiple feature points appear in the visual field of the telephoto camera, based on the relative position of each feature point to the center point of the visual field, the center of the visual field can moved to point at each feature point according to given time period and 1. Basic structure of monocular system: a wide angle lens camera (hereinafter as wide angle camera) is equivalent to the retina of a human eyeball without central cavity, and a zoom lens camera or telephoto lens camera (hereinafter as telephoto camera) is equivalent to the central cavity of a human eyeball. In other words, a complete eyeball can be made from combining the wide angle camera and the telephoto camera. Wide angle camera and telephoto camera are defined relatively. For example, if the camera to observe a distant mountain is defined as wide angle camera, the camera which is able to observe trees on the mountain should be defined as telephoto camera. Each "eyeball" is driven by two or three actuators, and together they are called monocular. To make the function of monocular exceed that of human eyeball, the monocular may consist multiple adjustable cameras with different visual field and shooting range. The distance between two of the monocular of the binocular system can be set arbitrarily, to several meters, even several kilometers. The further the distance in between, the more accurate it can determine the position of the distant object than that of human eyes.

2. The monocular or binocular can be cooperated with fixed wide angle camera or omnidirectional camera: For example, a wide angle lens camera or omnidirectional camera at an open space combine with one or more said monocular group constitute a monitor system, which can record the moving process of the objects within the monitored range. In addition, by transferring the location information of the monitored person from one monitor camera to another monitor camera at a different place, the person being monitored will not be mistaken as two different persons when this person moves from one place to another.

3. When an interested object appears within the view of the fixed wide angle camera or sequence.

In addition, when this oculomotor system-is installed on a moving object (e.g. a car), the binocular system can be placed on a base that can rotate with multiple degree of freedom, similar to a human head. A pair of three degrees of freedom rotation acceleration transducers and a pair of three degrees of freedom translation acceleration transducers are located on each side of the "head" to measure the movement of the head and send signals directly to control forward feeding movement of the "eyeballs", to enable the system to compensate the sight deviation caused by the movement of the object (similar to vestibulo-ocular reflex).

Multiple microphones can be installed on both sides of the head or other fixed location, to turn head to the sound source.

The embodiment of the control method of the present invention is shown as below:

1. The object position information is from the wide angle camera: The signal from the wide angle camera is used for forward feeding control through "saccade reflection control curve", so the position of the object can be located at the fastest speed the servo-actuator is capable of.

2. The tracking signal is from the telephoto camera, and from the acceleration transducer installed on the base. The following equations (1) and (2) use the position deviation signal of the telephoto camera, the relative speed signal of the object and the line of sight, and acceleration signal from the base to obtain the rotation angle of both eyeball, to conduct forward feeding control, to ensure that both eyes are focusing on and tracking the same object.

By using the above mentioned technical method, when the automatic vision and line of sight control system of the present invention are used in surveillance system, clear (precise) images of each person presented can be taken and recorded in turn, and each attendance's movement can be recorded real time, and automatically send out different levels of alarms. The present system can be used not only in fixed location indoor and outdoor surveillance, it can also be used in short distance low altitude on air surveillance, supplemental to a radar. In addition, the present system can be installed on many kinds of moving devices or equipments, such as car, train, airplane, boat, etc, by compensating the deviation of line of sight caused by severe and wide range movement of itself. Applying the control principle of the present invention to various robot's eyes, it will be possible to use household robot. Applying the control principle of the present invention, low cost camera (or fake eyeball) can be used as the eyes of the toys, and it will make the toys appear to be alive.

DETAILED DESCRIPTION OF THE INVENTION

Figure 1:
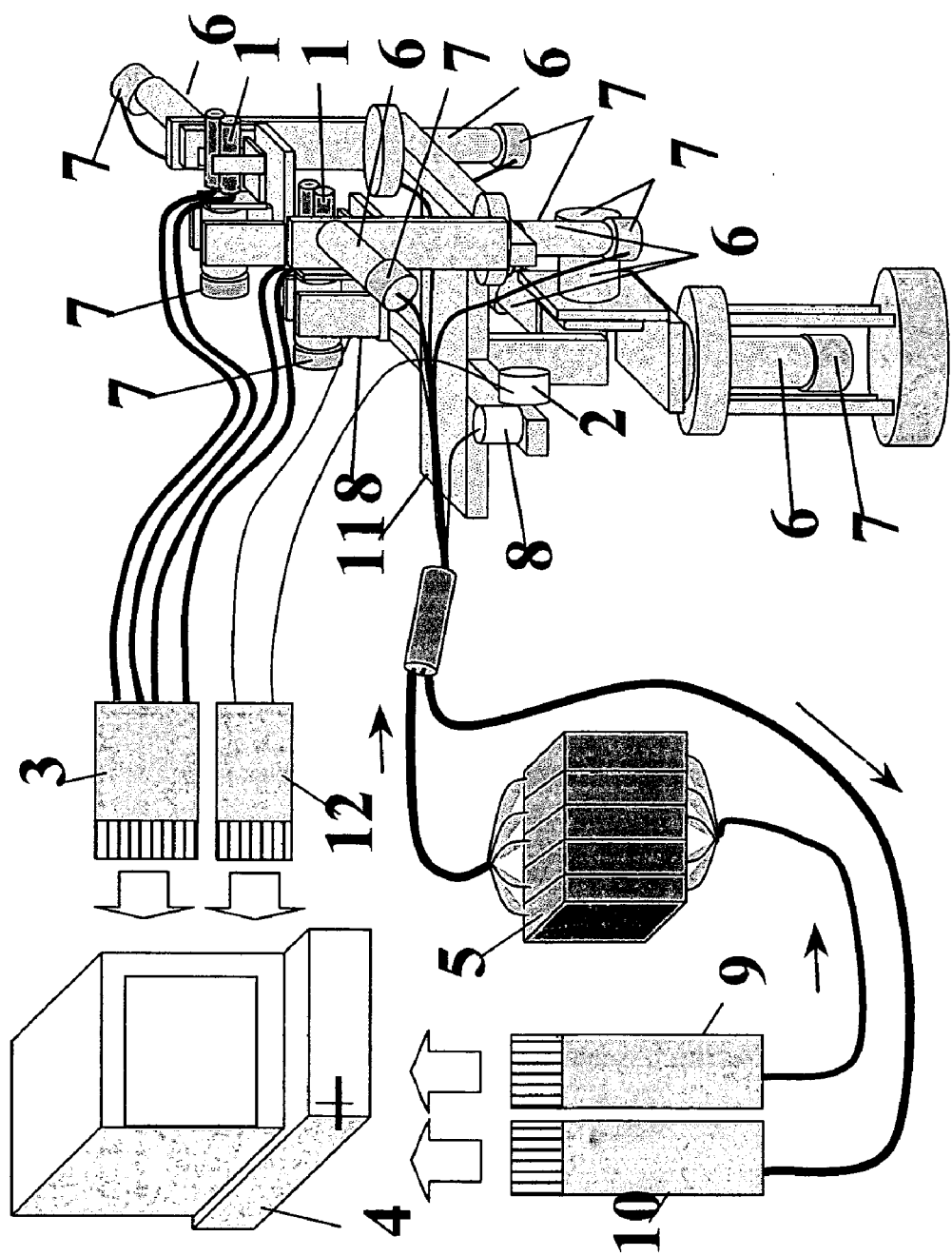
FIG. 1 is the construction of the binocular vision and line of sight movement control system.

FIG. 1 shows the construction of the binocular vision and line of sight control system. Each eyeball consists of two cameras. One is a wide angle camera, and the other is a telephoto camera. The cameras are set parallel and adjacent to each other, the nearer the better. The oculomotor system has nine degrees of freedom. Each eyeball (camera set 1) has three degree of freedom (when necessary, one actuator can be eliminated), and the head (base 11) has three degree of freedom (it is possible to decrease or eliminate the number of degree of freedom).

Two camera sets 1 are installed on the base 11. The actuator control circuit works like this: the digital signal from the central controller is inputted into the D/A converter 9, and the analog signal converted by the D/A converter 9 is inputted into the actuator driving controller 5, and the driving controller 5 drives the actuators 6, while the rotation transducer 7 on the actuators 6 send the rotation angle signal of actuator 6 to the A/D converter (or counter) 10, then sent to the central controller 4.

The image signals of each camera set 1 are sent to the central controller 4 through visual card 3, and the object position deviation and speed related to the line of sight of the camera are obtained through image processing.

The rotation and translation movement of the head (base 1) are detected by the rotation and translation acceleration transducers 8, and sent to the central controller 4 through the A/D converter (or counter) board 10.

The audio signal detected by the microphones 2 installed on both sides of the head (base 11) is sent to the central controller 4 through audio card 12, and the relative position of the sound source to the head is measured, to help the eyeball locate the object's position quickly.

Figure 2:
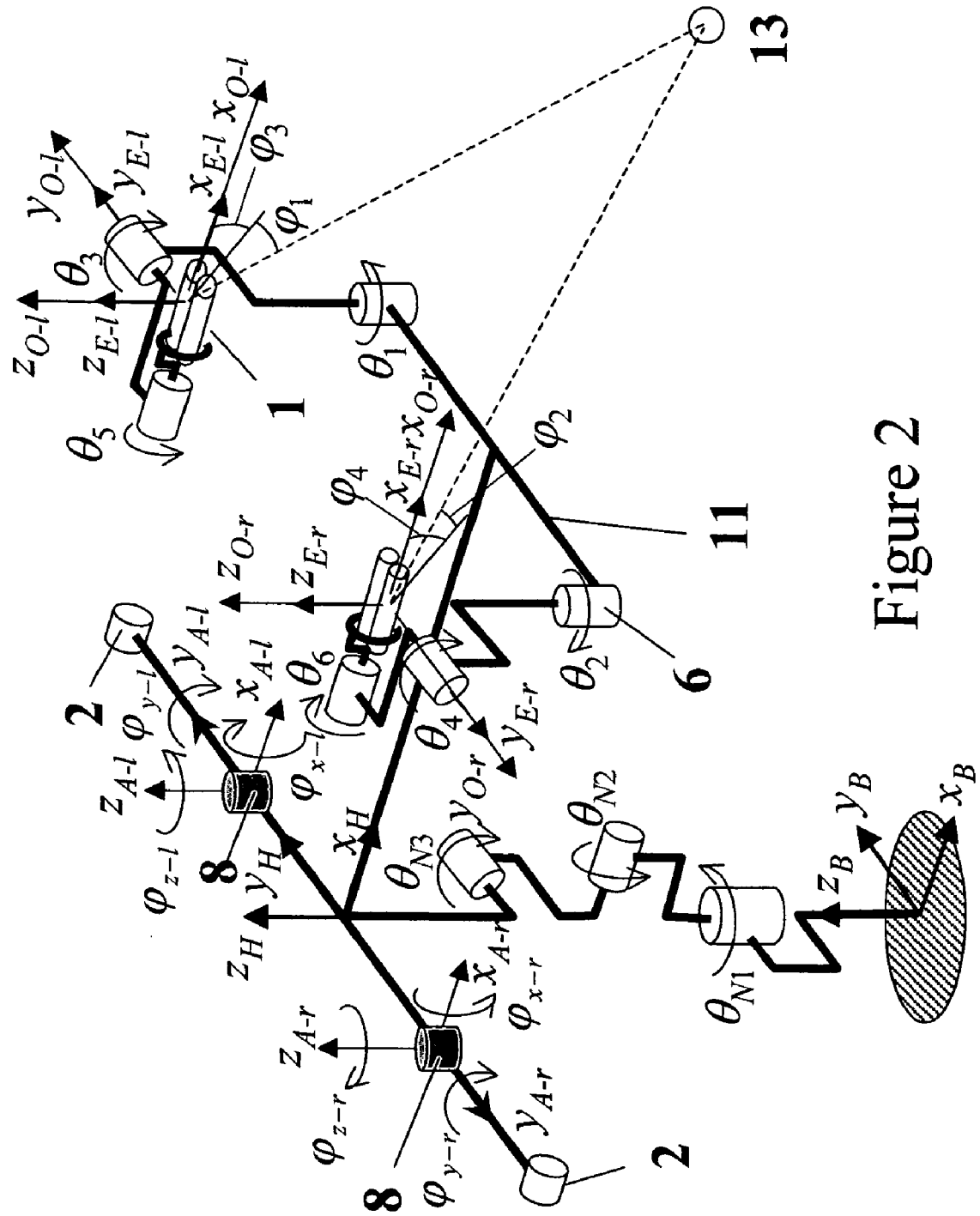
FIG. 2 is the coordinate systems of the binocular vision and line of sight movement control system.

FIG. 2 shows the coordinates system of the control system of the present invention. Coordinates $x_{A-l}$-$y_{A-l}$-$z_{A-l}$ and $x_{A-r}$-$y_{A-r}$-$z_{A-r}$ are the coordinates fixed to the left and right acceleration transducers 8 respectively. Coordinates $x_{E-l}$-$y_{E-l}$-$z_{E-l}$ and $x_{E-r}$-$y_{E-r}$-$z_{E-r}$ are the coordinates fixed to the left and right eyeballs (camera sets 1) respectively. Coordinates $x_{O-l}$-$y_{O-l}$-$z_{O-l}$ and $x_{O-r}$-$y_{O-r}$-$z_{O-r}$ are the coordinates fixed to the left and right eye sockets respectively. In other words, the origin point of the coordinates is the rotation center of camera set 1, and the coordinates is relatively fixed to the head (base 11), $\theta_1$, $\theta_2$ are respectively the rotation angle of actuators 6 lz and rz. That is to say, $x_{E-l}$-$y_{E-l}$-$z_{E-l}$ and $x_{E-r}$-$y_{E-r}$-$z_{E-r}$ are respectively the rotation angle around axes $z_{O-l}$ and $z_{O-r}$. $\theta_3$, $\theta_4$ are respectively the rotation angle of actuators 6 ly and 6 ry. That is to say, $x_{E-l}$-$y_{E-l}$-$z_{E-l}$ and $x_{E-r}$-$y_{E-r}$-$z_{E-r}$ are respectively the rotation angle around axes $y_{O-l}$ and $y_{O-r}$. $\phi_1$ and $\phi_2$ are respectively the rotation angle of the object around the eye socket fixed coordinates' axes $z_{O-l}$ and $z_{O-r}$. $\Phi_3$ and $\Phi_4$ are respectively the rotation angle of the object around the eye socket fixed coordinates' axes $y_{O-l}$ and $y_{O-r}$. All the coordinates showed in FIG. 2 are horizontally symmetrical. In other words, the positive rotation direction of actuator 6 lz and actuator 6 rz are opposite, so are that of the actuator 6 ly and actuator 6 ry.

Figure 3:
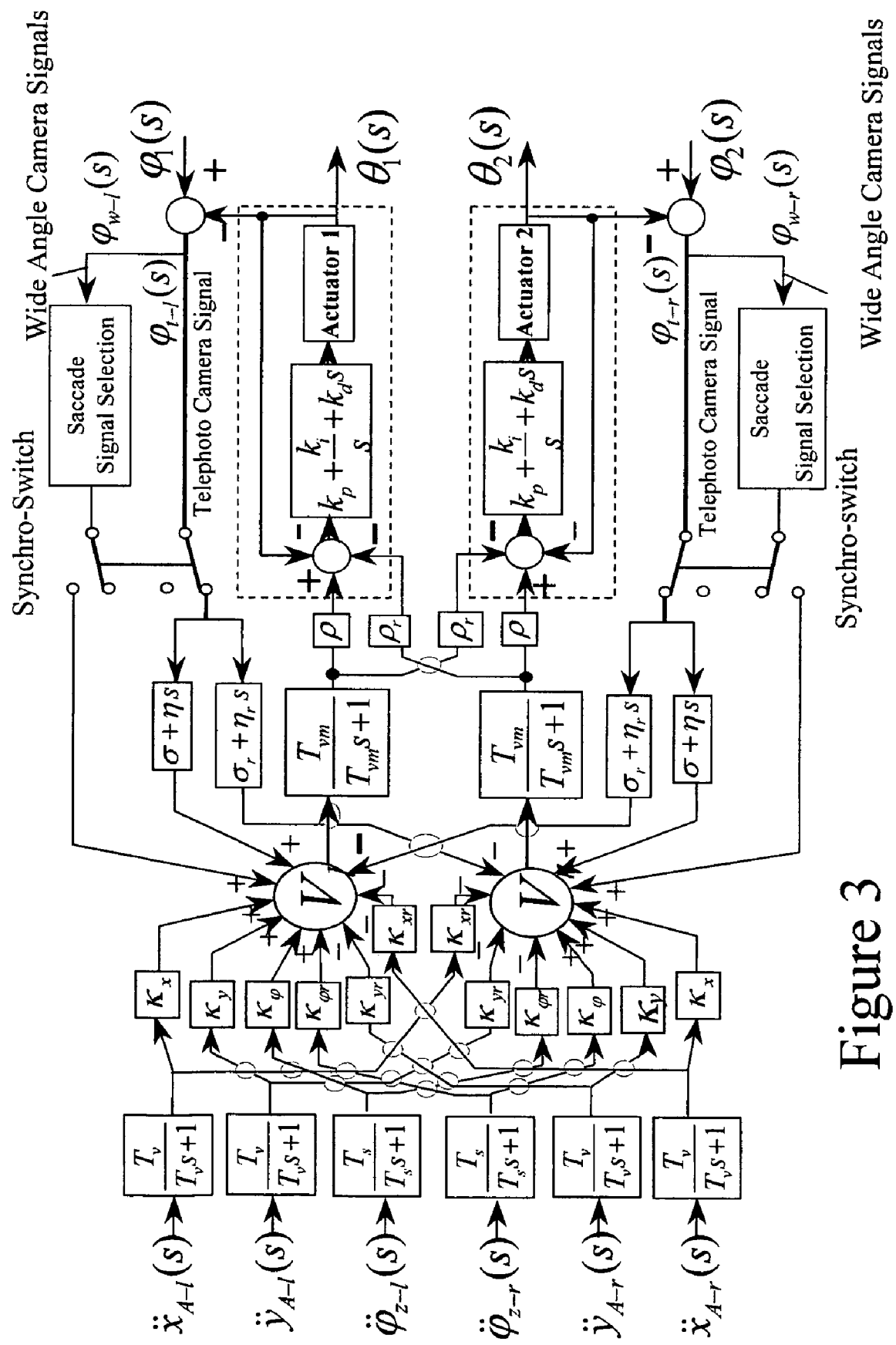
FIG. 3 is a block diagram of the horizontal movement of the binocular vision and line of sight control system.

FIG. 3 shows a block diagram of the binocular horizontal movement control system. $\phi_{t-l}$ and $\phi_{t-r}$ are respectively the horizontal deviation of the object and the line of sight of the telephoto cameras of camera set l and r. $\phi_{w-l}$ and $\phi_{w-r}$ are respectively the horizontal deviation between the object and the line of sight of the wide angle cameras of camera set l and r. Both $\phi_{t-l}$, $\phi_{t-r}$ and $\phi_{w-l}$, $\Phi_{w-r}$ correspond to $\phi$-$\theta_1$, $\tilde{\Phi}_2$-$\theta_2$, but from different cameras (refer to FIG. 2). $\ddot{x}_{A-l}$, $\ddot{y}_{A-l}$, $\ddot{\phi}_{z-l}$ and $\ddot{x}_{A-r}$, $\ddot{y}_{A-r}$, $\ddot{\phi}_{z-r}$ are respectively the translation acceleration signal and the rotation acceleration signal detected by the left and right acceleration transducers. Shown below is the translation function of the control system excluding the signal circuit of $\phi_{w-l}$ and $\phi_{w-r}$ measured by wide angle cameras.

$$\theta_1(s) + \theta_2(s) = \quad (1)$$

$$\frac{T_{vm}(\rho - \rho_r)}{1 + T_{vm}(\rho - \rho_r)(\sigma - \sigma_r) + T_{vm}(1 + (\rho - \rho_r)(\eta - \eta_r))s} \times$$

$$\left[ -(\kappa_x - \kappa_{xr})\frac{T_v}{T_v s + 1}(\ddot{x}_{A-l}(s) + \ddot{x}_{A-r}(s)) - (\kappa_y - \kappa_{yr})\frac{T_v}{T_v s + 1}(\ddot{y}_{A-l}(s) + \right.$$

$$\ddot{y}_{A-r}(s)) - (\kappa_\varphi - \kappa_{\varphi r})\frac{T_s}{T_s s + 1}(\ddot{\varphi}_{z-l}(s) + \ddot{\varphi}_{z-r}(s)) +$$

$$\left. (\sigma - \sigma_r)(\varphi_{t-l}(s) + \varphi_{t-r}(s)) + (\eta - \eta_r)(\dot{\varphi}_{t-l}(s) + \dot{\varphi}_{t-r}(s)) \right]$$

$$\theta_1(s) - \theta_2(s) = \quad (2)$$

$$\frac{T_{vm}(\rho + \rho_r)}{1 + T_{vm}(\rho + \rho_r)(\sigma + \sigma_r) + T_{vm}(1 + (\rho + \rho_r)(\eta + \eta_r))s} \times$$

$$\left[ -(\kappa_x + \kappa_{xr})\frac{T_v}{T_v s + 1}(\ddot{x}_{A-l}(s) - \ddot{x}_{A-r}(s)) - (\kappa_y + \kappa_{yr})\frac{T_v}{T_v s + 1}(\ddot{y}_{A-l}(s) - \right.$$

$$\ddot{y}_{A-r}(s)) - (\kappa_\varphi + \kappa_{\varphi r})\frac{T_s}{T_s s + 1}(\ddot{\varphi}_{z-l}(s) - \ddot{\varphi}_{z-r}(s)) +$$

$$\left. (\sigma + \sigma_r)(\varphi_{t-l}(s) + \varphi_{t-r}(s)) + (\eta + \eta_r)(\dot{\varphi}_{t-l}(s) - \dot{\varphi}_{t-r}(s)) \right]$$

Wherein, $T_{vm}$, $T_v$, $T_s$ are time constants, and $\rho$, $\rho_r$, $\sigma$, $\sigma_r$, $\eta$, $\eta_r$, $\kappa_x$, $\kappa_{xr}$, $\kappa_y$, $\kappa_{yr}$, $\kappa_\varphi$, $\kappa_{\varphi r}$ are all positive parameters. $\dot{\phi}_{t-l}$ and $\dot{\phi}_{t-r}$ are respectively the relative speed between the object and the line of sight of the telephoto cameras of the left and right camera set. Equation (1) is the equation of vergence movement, and Equation (2) is equation of conjugate movement. Each actuator's rotation angle can be obtained through (1)+(2) and (1)−(2). According to equation (1) and (2), the response speed of conjugate movement (proportional to reciprocal of time constant $T_{vm}[1+(\rho-\rho_r)(\eta-\eta_r)]/[1+T_{vm}(\rho-\rho_r)(\sigma-\sigma_r)]$) is faster than that of vergence movement (proportional to reciprocal of time constant $T_{vm}[1+(\rho+\rho_r)(\eta+\eta_r)]/[1+T_{vm}(\rho+\rho_r)(\sigma+\sigma_r)]$). This feature ensures that both eyes are able to focus at that the same object simultaneously.

The signals $\phi_{w-l}$ and $\phi_{w-r}$ of the object obtained from processing the images from the wide angle cameras are used to select best "saccade" control curve. The control curve is used to control actuator to rotate rapidly, to obtain the effect of saccade movement. In addition, the signal from the telephoto camera is cut off when the "saccade reflection" control is used. The generation of saccade eye movement control curve is realized through linear Fourier Series Transformation. Concretely, if assuming that the line of sight moves from current position to the object position within time T, the system control curve consists of m series of sine curve and cosine curve with cycle T, T/2, T/3, . . . T/m.

$$f(t) = \frac{a_0}{2} + \sum_{n=1}^{m} \left( a_n \cos\frac{2n\pi}{T}t + b_n \sin\frac{2n\pi}{T}t \right)$$

Wherein, $a_0$, $a_n$, $b_n$ are obtained by using repetitive learning Inverse Fourier Transformation to process control error by reverse transformation. That is, $$a_n[i+1] = a_n[i] + k_a \frac{4}{T}\int_0^T (R(t) - {}^i\theta(t))\cos\frac{2n\pi}{T}t\,dt \quad (n = 0, 1, 2, 3 \ldots m)$$

$$b_n[i+1] = b_n[i] + k_b \frac{4}{T}\int_0^T (R(t) - {}^i\theta(t))\sin\frac{2n\pi}{T}t\,dt \quad (n = 1, 2, 3 \ldots m)$$

Wherein, i indicates the number of learning times. R(t) is the optimal locus of the actuator from transformation of the error measured by wide angle cameras. ${}^i\theta(t)$ is the rotation angle of the actuator at the ith learning time. Actuator 6l and actuator 6r use the same method for learning. Each curve can be generated and sustained_with 2m+1 coefficients ($a_0$, $a_n$, $b_n$, n=1, 2 . . . m) (generally m<10). Since it is possible that each camera set 1 needs hundreds of thousands of saccade eye movement control curve,_a great amount of memory capacities can be saved, and the memories can be quickly uploaded. of the feedback circuit of the block diagram can also be removed.

When the automatic vision and line of sight control system is fixed to a big volume indoor space for surveillance, a fixed sky eye, a camera with super wide camera lens (nickname fish-eye lens) or an omnidirectional camera can record the whole moving process of all the moving objects in the surveillance area, and send the interested object to binocular line of sight control system.

Figure 5:
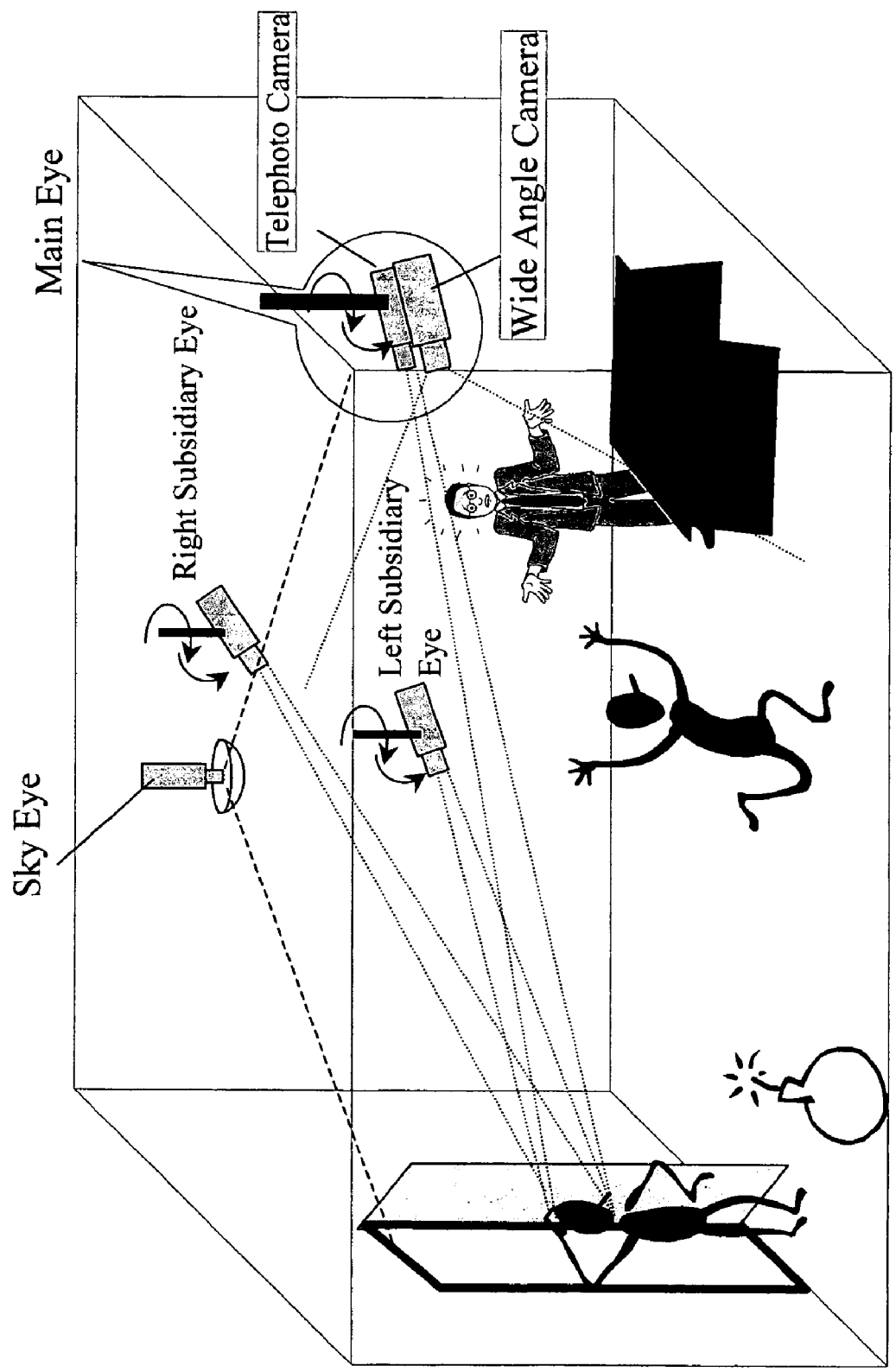
FIG. 5 is an actual example of using the system in a monitor system.

In FIG. 5, both the main eye and the subsidiary eye have two rotation degree of freedom monocular structure and the camera fixed on the ceiling is an omnidirectional camera. When an unknown person enter the room, the omnidirectional camera will detect the approximate position of the person, then the main eye will rotate at high speed and turn to the person, and then the wide angle camera of the main eye will find the head of the person, and the center of the view field of the wide angle camera will aim at the head of the person, and then the telephone camera can take clear image of the person's head. The subsidiary eye will follow main eye's movement to take images of the head from different angles. It is possible to add microphones to the surveillance system, to treat the sound of the field and determine the position.

Figure 4:
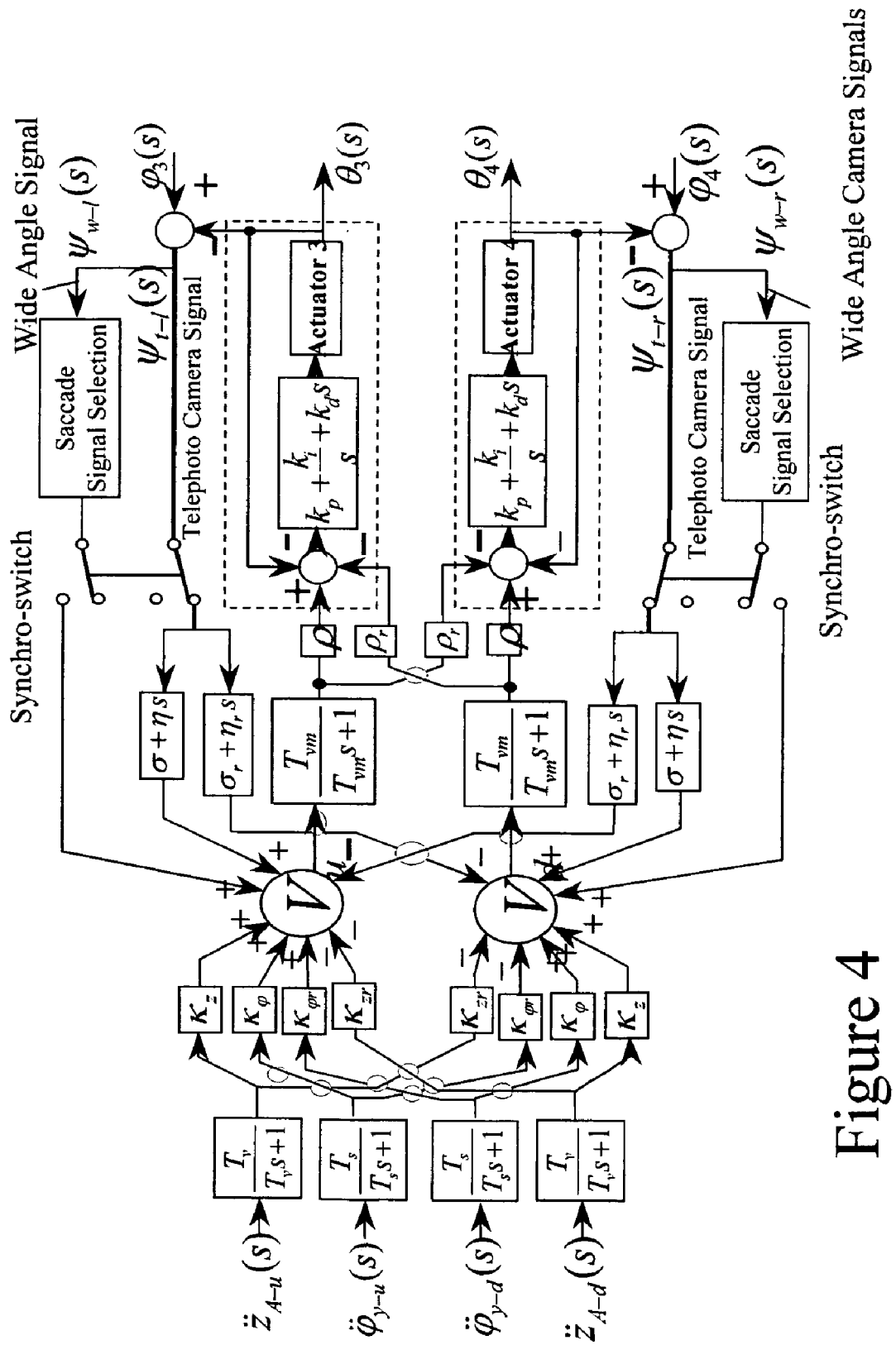
FIG. 4 is a block diagram of vertical movement of the binocular vision and line of sight control system.

The optimal construction of the automatic vision and line of sight control system is a binocular system (It has two camera sets), the location of which can be determined by specific design, and two or more set can be installed, and each eye can add various sets of cameras with different angles and shooting ranges. In the case of multiple units of binocular systems, the unit that the central controller gives the highest priority is called main unit of eyes. While each binocular system with two camera sets track the same object, different binocular system can track different object respectively (just like each FIG. 4 shows a block diagram of the binocular vertical movement control system. $\psi_{t-l}$ and $\psi_{t-r}$ are respectively the vertical deviation between the object and the line of sight of the telephoto cameras of camera set l and r. $\psi_{t-l}$ and $\psi_{t-r}$ are respectively the vertical deviation between the object and the line of sight of the wide angle cameras of camera set .l and .r. $\ddot{z}_{A-l}$, $\ddot{\varphi}_{y-l}$ and $\ddot{z}_{A-r}$, $\ddot{\varphi}_{y-r}$ are respectively the translation acceleration transducers and the rotation acceleration signal detected by the left and right acceleration transducers (refer to FIG. 2). The control principle of FIG. 4 is completely same as that of FIG. 3. However, since the relative movement of two eyeballs during vertical movement has not yet been observed in biology field, we assume $\rho=\rho_r$ here, that is, $\theta_3$ and $\theta_4$ are the same.

Same as FIG. 3, in case of the vertical eyeball movement control block diagram FIG. 4, the signal from the wide angle camera is used for choosing saccade eye movement control curve and controlling feed forward. The deviation signal between the object and the line of sight from the telephoto camera, and the object movement speed relative to the line of sight, is used for feed back control. The translation and rotation acceleration signals measured by left and right acceleration transducers 8 (two types of transducers are both called rotation and translation acceleration transducers 8), are used directly for eyeball feed forward movement control, similar to vestibulo-ocular reflex, to compensate vibration of the base of the visual system. This control system does not use the translation and rotation acceleration signals directly, but use the signals after they are processed through a leakage integral (T/(Ts+1)). For monocular control system, only half of the control diagram will be used. Moreover, in case of simple binocular control, it is possible to realize the control even remove the actuator 2 and actuator 4 in FIGS. 3 and 4. When using fake eyeball binocular control, besides removing the actuator 2 and actuator 4, half person can focus on only one object at one time, while several people can focus on different objects at the same time).

What is claimed is:

1. A bionic automatic vision and line of sight control system comprises:

multiple camera sets, wherein each camera set comprises multiple parallel cameras;

a base where the camera sets are mounted;

multiple actuators which enable each camera set to rotate in three degrees of freedom relative to the base;

multiple transducers for detecting the rotation angle and speed of the actuators; and a central controller which processes the signals from the camera sets and the transducers, and controls the rotation of the actuators and sends results from processing signals and other information to peripheral equipments.

2. The bionic automatic vision and line of sight control system as claimed in claim 1, wherein each of the camera set comprises wide angle lens cameras and telephoto lens cameras.

3. The bionic automatic vision and line of sight control system as claimed in claim 1, wherein the base is moveable, wherein the acceleration transducers are installed on the base to measure six rotation and translation degrees of freedom, wherein the acceleration transducers are in even numbers and symmetric horizontally with respect to center axis of the base.

4. The bionic automatic vision and line of sight control system as claimed in claim 2, wherein the base are driven by three actuators to enable three degrees of freedom rotation.

5. The bionic automatic vision and line of sight control system as claimed in claim 1, wherein the system comprises microphones installed on the base for receiving audio signals and sending the signals to the central controller.

6. The bionic automatic vision and line of sight control system as claimed in claim 1, wherein each camera set is driven by three actuators for three degrees of freedom rotation, wherein the third degree of freedom is for rotating around one center axis of the camera, wherein the distance between each rotation center axis can be adjusted according to the distance with the object to obtain more accurately measured object distance.

7. The bionic automatic vision and line of sight control system as claimed in claim 1, wherein the system further comprises wide angle lens cameras fixed in an open space or omnidirectional cameras controlled by central controller.

8. A bionic automatic vision and line of sight control method of the bionic automatic vision and line of sight control system as claimed in claim 1, wherein (1) When an object enters the visual field of the telephoto lens camera, the system searches the feature point of the object and put the feature point at the visual field center;

(2) When the feature point of the object in the telephoto camera's visual field moves, the image process program corresponding to the telephoto camera will calculate the horizontal and vertical deviation and speed of the feature point in relevant to the center of the visual field, wherein the deviation and speed signals will be used to control the rotation of the camera set to enable the line of sight of the camera automatically track the feature point;

(3) When multiple feature points appear in the visual field of the telephoto lens camera, the system controls the camera's line of sight to sequentially align each feature point with the visual field center at given intervals, according to the relationship between each feature point and the visual field center.

9. A bionic automatic vision and line of sight control method of the bionic automatic vision and line of sight control system as claimed in claim 1, wherein the rotatable camera set includes wide angle lens camera, wherein (1) When the wide angle lens camera of the camera set finds an interested object, the camera set rotates at high speed, corresponding to the saccade eye movement, focus the line of sight on the object to make the feature point as the visual field center;

(2) Because the wide angle lens camera and the telephoto lens camera of the camera set are parallel and adjacent to each other, when an object is at the visual field center of the wide angle lens camera, the object is automatically at the visual field center of the telephoto lens camera.

10. The bionic automatic vision and line of sight control method as claimed in claim 8, wherein when using fixed wide angle lens camera or omnidirectional camera, When the fixed wide angle lens camera or the omnidirectional camera finds an interested object, through position transformation of the object, the system calculates the direction of the object related to the rotatable camera sets, and quickly turns the line of light of the camera set towards the object.

11. The bionic automatic vision and line of sight control method as claimed in claim 9, wherein when multiple interested objects appear in the visual field of the wide angle lens camera or omnidirectional camera, according to the sequence of appearance or position, the camera sets focus and track respectively each object at set time intervals.

12. The bionic automatic vision and line of sight control method as claimed in claim 10, wherein when multiple interested objects appear in the visual field of the wide angle lens camera or omnidirectional camera, according to the sequence of appearance or position, the camera sets focus and track respectively each object at set time intervals.

13. The bionic automatic vision and line of sight control method as claimed in claim 8, wherein when the camera sets comprises two camera sets for corresponding control, the response speed of two camera sets' conjugate movement is faster than the response speeds of their vergence movement, wherein the control system is called bionic binocular automatic vision and line of sight control system.

14. The bionic automatic vision and line of sight control method as claimed in claim 13, wherein the transforming functions of the respective actuator control systems of the two camera sets are:

$$\theta_1(s) + \theta_2(s) =$$

$$\frac{T_{vm}(\rho - \rho_r)}{1 + T_{vm}(\rho - \rho_r)(\sigma - \sigma_r) + T_{vm}(1 + (\rho - \rho_r)(\eta - \eta_r))s \times}$$

$$\left[ -(\kappa_x - \kappa_{xr})\frac{T_v}{T_v s + 1}(\ddot{x}_{A-l}(s) + \ddot{x}_{A-r}(s)) - (\kappa_y - \kappa_{yr})\frac{T_v}{T_v s + 1}(\ddot{y}_{A-l}(s) + \ddot{y}_{A-r}(s)) - (\kappa_\varphi - \kappa_{\varphi r})\frac{T_s}{T_s s + 1}(\ddot{\varphi}_{z-l}(s) + \ddot{\varphi}_{z-r}(s)) + (\sigma - \sigma_r)(\varphi_{t-l}(s) + \varphi_{t-r}(s)) + (\eta - \eta_r)(\dot{\varphi}_{t-l}(s) + \dot{\varphi}_{t-r}(s)) \right]$$

$$\theta_1(s) - \theta_2(s) =$$

$$\frac{T_{vm}(\rho + \rho_r)}{1 + T_{vm}(\rho + \rho_r)(\sigma + \sigma_r) + T_{vm}(1 + (\rho + \rho_r)(\eta + \eta_r))s \times}$$

$$\left[ -(\kappa_x + \kappa_{xr})\frac{T_v}{T_v s + 1}(\ddot{x}_{A-l}(s) - \ddot{x}_{A-r}(s)) - (\kappa_y + \kappa_{yr})\frac{T_v}{T_v s + 1}(\ddot{y}_{A-l}(s) - \ddot{y}_{A-r}(s)) - (\kappa_\varphi + \kappa_{\varphi r})\frac{T_s}{T_s s + 1}(\ddot{\varphi}_{z-l}(s) - \ddot{\varphi}_{z-r}(s)) + (\sigma + \sigma_r)(\varphi_{t-l}(s) - \varphi_{t-r}(s)) + (\eta + \eta_r)(\dot{\varphi}_{t-l}(s) - \dot{\varphi}_{t-r}(s)) \right]$$

wherein, $\phi_{t-l}, \phi_{t-r}$ are respectively the horizontal deviation angle between the object and the line of sight measured by the left and right telephoto camera sets, $\ddot{x}_{A-l}, \ddot{y}_{A-l}, \ddot{\phi}_{z-l}$ and $\ddot{x}_{A-r}, \ddot{y}_{A-r}, \ddot{\phi}_{z-r}$ are the rotation acceleration and translation acceleration measured by the left and right acceleration transducers, $T_{vm}, T_v, T_s$ are time constant, $\rho, \rho_r, \sigma, \sigma_r, \eta, \eta_x, \kappa_{xr}, \kappa_y, \kappa_{yr}, \kappa_{101}, \kappa_{\varphi r}$ are positive parameters, $\dot{\phi}_{t-l}, \dot{\phi}_{t-r}$ are respectively the speed of the object related to the line of sight measured by the left and right telephoto camera sets, wherein the first equation is the equation of the relative movement between the two camera set, and the second equation is the equation of the common movement of the two camera set, wherein by adding and subtracting of the two equations, the rotation angle of each actuator is obtained.

15. The bionic automatic vision and line of sight control method as claimed in claim 9, wherein the saccade control curve $f(t)$ is from linear Fourier transformation, as:

$$f(t) = \frac{a_0}{2} + \sum_{n=1}^{m}\left(a_n \cos\frac{2n\pi}{T}t + b_n \sin\frac{2n\pi}{T}t\right)$$

wherein, $a_0, a_n, b_n$ are obtained by reverse transformation of the control deviation by repeating learning Fourier reverse transformation:

$$a_n[i+1] = a_n[i] + k_a \frac{4}{T}\int_0^T (R(t) - {}^i\theta(t))\cos\frac{2n\pi}{T}t\,dt \quad (n = 0, 1, 2, 3 \ldots m)$$

$$b_n[i+1] = b_n[i] + k_b \frac{4}{T}\int_0^T (R(t) - {}^i\theta(t))\sin\frac{2n\pi}{T}t\,dt \quad (n = 1, 2, 3 \ldots m)$$

wherein, T is the time required for moving the line of sight from the current position to the target position, i is the times of learning, R(t) is optimum actuator movement lotus of the by transforming deviation measured by wide angle lens camera, ${}^i\theta(t)$ is the corresponding actuators' rotation angle of the i learning times.

16. The bionic automatic vision and line of sight control method as claimed in claim 10 wherein the saccade control curve $f(t)$ is from linear Fourier transformation, as:

$$f(t) = \frac{a_0}{2} + \sum_{n=1}^{m}\left(a_n \cos\frac{2n\pi}{T}t + b_n \sin\frac{2n\pi}{T}t\right)$$

wherein, $a_0, a_n, b_n$ are obtained by reverse transformation of the control deviation by repeating learning Fourier reverse transformation:

$$a_n[i+1] = a_n[i] + k_a \frac{4}{T}\int_0^T (R(t) - {}^i\theta(t))\cos\frac{2n\pi}{T}t\,dt \quad (n = 0, 1, 2, 3 \ldots m)$$

$$b_n[i+1] = b_n[i] + k_b \frac{4}{T}\int_0^T (R(t) - {}^i\theta(t))\sin\frac{2n\pi}{T}t\,dt \quad (n = 1, 2, 3 \ldots m)$$

wherein, T is the time required for moving the line of sight from the current position to the target position, i is the times of learning, R(t) is optimum actuator movement lotus of the by transforming deviation measured by wide angle lens camera, ${}^i\theta(t)$ is the corresponding actuators' rotation angle of the i learning times.

17. The bionic automatic vision and line of sight control method as claimed in claim 8, wherein the camera set sets on the base, wherein when the base moves, the vibrations or movements of the base are compensated in two ways:

1) When the base moves, the rotation acceleration transducer and translation acceleration transducer installed on the base send motion signals measured from the base to the central controller, wherein the signals are processed through leakage integral to adjust the line of sight position of each camera set to compensate the vibration or movement of the base, wherein the leakage integral processes the signals through transmission function T/Ts+1), wherein T is time constant, s is the complex parameter of Laplace Transformation;

2) When the actuators for driving the base movement rotate, the rotation transducers and rotation speed transducers of the actuators send the measured actuator movement signals to central controller to adjust the position of the line of sight of the camera set to compensate the vibration or movement of the base.

* * * * *